3,155,756
MOLDING OF STRESS-FREE POLY-
CARBONATE ARTICLES
Wilhelm Hechelhammer, Krefeld-Bockum, and Hugo Streib, Krefeld-Uerdingen, Germany, assignors to Farbenfabriken Bayer Aktiengesellschaft, Leverkusen, Germany, a corporation of Germany
No Drawing. Filed Mar. 6, 1961, Ser. No. 93,306
Claims priority, application Germany Mar. 8, 1960
10 Claims. (Cl. 264—178)

This invention relates generally to polycarbonate plastics, and more particularly, to a method for making substantially stress-free shaped polycarbonate articles.

It has been proposed heretofore to prepare polycarbonate plastics, such as, for example, in Canadian Patents 578,585 and 578,795 issued June 30, 1959 and Canadian Patent 594,805 issued March 22, 1960. One of the more popular methods of making polycarbonate plastics involves reacting a di(monohydroxyaryl)-alkane with a derivative of carbonic acid, such as a carbonic acid diester or phosgene. It has been found that polycarbonate plastics can be shaped into various articles of commercial importance, such as, for example, helmets, films, fibers, tubes and the like. However, the shaping of the polycarbonate plastic, such as, for example, the extrusion of a tube or the molding of an article like a miner's helmet, frequently produces a product having high internal stresses, it is not entirely satisfactory for some purposes and will frequently crack or break. This can be shown by subjecting a molded article having internal stresses to the action of certain organic fluids including hot mineral oil. Because of the libration of the stresses when this is done, the article cracks or breaks into pieces in a short time. It is possible to reduce the internal stresses of the shaped polycarbonate by heating or annealing it after shaping for a long period of time at a temperature of from about 120° C. to about 145° C. Usually about one hour of a heat treatment is required per millimeter wall thickness of the shaped article. Obviously, such a process is burdensome and not well suited for commercial practice.

It is, therefore, an object of this invention to provide an improved method for making a substantially stress-free shaped polycarbonate body. Another object of the invention is to provide a method for making a substantially stress-free shaped polycarbonate body by a continuous process in which the stresses are prevented during the fabrication thereof. Still another object of the invention is to provide a process for producing shaped polycarbonate articles free from internal stresses which is readily adaptable to commercial production methods. A still further object of the invention is to provide a substantially stress-free shaped polycarbonate article without the necessity of resorting to an extended post-treatment of the shaped product.

The foregoing objects and others are accomplished, generally speaking, in accordance with this invention by providing a method for shaping a high molecular weight thermoplastic polycarbonate while it is subjected to an atmosphere at a temperature of from about 70° C. to about 120° C. and immediately subjecting the shaped article after it is removed from the shaping device into an atmosphere having a temperature of from about 70° C. to about 120° C. Best results have been obtained up to this time when the temperature of the shaping device and the atmosphere surrounding the newly shaped article is from about 80° C. to about 100° C. so this temperature range is preferred.

In making a shaped polycarbonate article by an injection molding process, the mold is preheated to a temperature within the range set forth above and the mold is then charged with the polycarbonate. If, on the other hand, tubes are being made by an extrusion process, the product is subjected to the prescribed temperature by preheating the sizing die and immediately subjecting the product to an atmosphere of the prescribed temperature after it leaves the sizing die. In a process where a tube is made by a process where the tube after it is extruded is drawn through a vacuum sizing die and then a water bath to effect termination of the solidification of the polycarbonate, both the sizing die and the subsequent water bath are maintained at a temperature within the above defined limits.

The polycarbonate at time of shaping is preferably above about 220° C. Preferably the molecular weight of the polycarbonate is at least about 15,000.

It has been found that polycarbonate articles shaped in accordance with the process of this invention are substantially free from internal stresses as evidenced by the fact that they crack very little, if any, when dipped into organic fluids, such as hot mineral oil, or when they are dipped into surface active agents or other quenching or solubilizing fluids. The invention provides a method particularly advantageous for making safety helmets for miners or football players, electrical connectors, cups and saucers and the like.

Although the product provided by this invention is usually sufficiently stress-free for most purposes, it can be subjected, if desired, to a further heat treatment process of the type formerly used as the sole means of avoiding stresses. In other words, if desired to produce a product having optimum characteristics, the product of this invention can be subjected to a heat treatment or anneal at a temperature of from about 120° C. to about 145° C. after it has been subjected to 70° C. to 120° C. However, it is not necessary to heat the article for as long a period of time at this higher temperature since it has been practically completely stress relieved during shaping and immediate post treatment.

The subjection of the freshly shaped article to a temperature of from 70° C. to about 120° C. for any period of time results in an improvement but best results are obtained if the freshly shaped article is subjected to the specified temperature for from about 0.3 to about 60 minutes, that is to say until the resin is completely solidified.

In order better to describe and further clarify the invention, the following is a specific example thereof:

*Example*

A tube is continuously formed, using a screw extruder with a ring nozzle and a vacuum sizing die, from a polycarbonate based upon bis-(hydroxyphenyl)-propane with a relative viscosity of 1.32 measured in 0.5 percent methylene chloride solution at 25° C. prepared in accordance with Example 12 of Canadian Patent 578,585. The temperature of the heating zone 1 of the screw press is 253° C.; of the heating zone 2, 275° C.; and of the heating zone 3, 280° C. The draw off velocity of the tube amounts to 44 cm./minute.

If the sizing die and the water bath are cooled in the usual manner with cooling water at 13–14° C., then a tube is obtained with very marked internal stresses. If this tube is cut into pieces about 10 cm. long and ten of the pieces dipped into carbon tetrachloride, then, on an average, they break up after only 17 seconds with the formation of large cracks. However, if the vacuum sizing die and the water bath are supplied with water at about 85° C., then the ten pieces of tube first begin to show signs of the formation of cracks when dipped into carbon tetrachloride after 97 seconds.

If the tube produced with the use of hot water is tempered for a few hours at 140° C. in an air-drying cabinet, then even when storing the pieces of tube in carbon tetrachloride for several hours no formation of cracks occurs.

It is to be understood that the invention is applicable to the shaping of any polycarbonate plastic. The method for making these plastics is described in the art, such as, for example, in the Canadian patents referred to hereinbefore. The disclosures in those patents are incorporated herein by reference and are not repeated here because the chemical preparation of the polycarbonate is not part of this invention.

The nature of the atmosphere surrounding the article immediately after it is shaped should be inert but otherwise is not critical. It can be, for example, heated air, water, nitrogen, argon, or other inert gas or any other suitable fluid medium.

Although the invention has been described in considerable detail for the purpose of illustration, it is to be understood that variations may be made therein by those skilled in the art without departing from the spirit of the invention and the scope of the claims.

What is claimed is:

1. A method for making a substantially stress-free shaped article comprising a thermoplastic polycarbonate which comprises both shaping the polycarbonate and immediately post treating it while subjected to a temperature of from about 70° C. to about 120° C. until the polycarbonate is completely solidified.

2. The process of claim 1 wherein the shaped article is heat treated for a further period of time at a temperature of from about 120° C. to about 145° C.

3. A method for forming a substantially stress-free polycarbonate article which comprises shaping a polycarbonate in a mold having a temperature of from about 70° C. to about 120° C. and subjecting the resulting article immediately after it is removed from the mold to a temperature of from about 70° C. to about 120° C. until the polycarbonate is completely solidified.

4. A method for making a polycarbonate tube which comprises extruding the tube and passing the tube as it leaves the die into an atmosphere having a temperature of from about 70° C. to about 120° C. until the polycarbonate is completely solidified.

5. The process of claim 4 wherein the said atmosphere is a water bath.

6. A method for making a substantially stress-free shaped article comprising a thermoplastic polycarbonate which comprises molding the polycarbonate in a device having a temperature of from about 80° C. to about 100° C. and immediately subjecting the shaped article after it is removed from the mold to a temperature of from about 80° C. to about 100° C. until the polycarbonate is completely solidified.

7. A method for making a tube which comprises shaping a polycarbonate into a tube, drawing the tube through a vacuum sizing die and a water bath both at a temperature of from about 70° C. to about 120° C. until the polycarbonate is completely solidified.

8. A method for making a shaped polycarbonate which comprises extruding a polycarbonate while it is exposed to a temperature of from about 70° C. to about 120° C. and maintaining the temperature surrounding the polycarbonate within the said temperature range until the polycarbonate has completely solidified.

9. A method for making a shaped polycarbonate by an injection molding process which comprises molding the polycarbonate while it is exposed to an environment temperature of from about 70° C. to about 120° C. and maintaining the temperature surrounding the polycarbonate within the said temperature range until the polycarbonate has completely solidified.

10. A method for forming a substantially stress-free polycarbonate article which comprises shaping a polycarbonate at a temperature of at least about 220° C. in a mold having a temperature of from about 70° C. to about 120° C. and subjecting the resulting article immediately after it is removed from the mold to a temperature of from about 70° C. to about 120° C. for from about 0.3 to about 60 minutes until the polycarbonate has completely solidified.

References Cited in the file of this patent

UNITED STATES PATENTS

| 2,157,049 | Bartoe | May 2, 1939 |
| 2,789,970 | Reynolds et al. | Apr. 23, 1957 |
| 2,789,971 | Reynolds et al. | Apr. 23, 1957 |
| 2,990,580 | Foster | July 4, 1961 |
| 3,021,568 | Scott | Feb. 20, 1962 |

OTHER REFERENCES

Dunlap et al.: "Annealing Injection-Molded Styrene," Modern Plastics, August 1950, pages 83, 86, 88, 89.

E. I. du Pont de Nemours & Co. "Lucite" Acrylic Resin-Injection Molding, Information Bulletin No. X-49d, September 1958, page 7.